United States Patent [19]

Quehen

[11] 4,024,755
[45] May 24, 1977

[54] DEFLECTOR ROLL FOR MEASURING AND CHECKING THE FLATNESS OF SHEET METAL STRETCHED IN MOTION

[75] Inventor: André Quehen, Pontoise, France

[73] Assignee: Secim, Courbevoie, France

[22] Filed: June 10, 1976

[21] Appl. No.: 694,797

[30] Foreign Application Priority Data

June 13, 1975 France .............................. 75.18513
May 5, 1976 France .............................. 76.13407

[52] U.S. Cl. ............................................... 73/105
[51] Int. Cl.² ......................................... G01B 5/28
[58] Field of Search ........................... 73/105, 141 A

[56] References Cited

UNITED STATES PATENTS 2,896,196 7/1959 Hartford et al. ..................... 73/105
3,377,828 4/1968 Harmon ............................... 73/105

Primary Examiner—James J. Gill
Assistant Examiner—Anthony V. Ciarlante

[57] ABSTRACT

A deflector roll for measuring and checking the flatness of sheet metal under tension and as it passes round the roll comprises a non rotatable inner portion carrying axially spaced radial stress detectors in axially spaced measurement zones spaced by neutral zones, and a continuous rotatable outer envelope to be contacted by the sheet and to transmit the radial stresses to the detecting devices, the envelope having an axially variable flexibility such that it is less flexible in those portions which cover the measurement zones than in those portions which cover the neutral zones.

14 Claims, 8 Drawing Figures

DEFLECTOR ROLL FOR MEASURING AND CHECKING THE FLATNESS OF SHEET METAL STRETCHED IN MOTION

The invention concerns the measurement and checking of the inherent flatness of sheet metal stretched in motion, for example, during the course of or at the conclusion of an operation of rolling or stretching the metal sheet.

It is indeed necessary during rolling of metal strip, more particularly during cold rolling of thin strip, to detect defects in the inherent flatness of these strips and to correct these defects by acting upon the rolling conditions, or to perform a simple check of the quality of the product at the end of operation. In order to carry out this adjustment or this checking a deflector-roll is generally employed, over which the sheet metal to be checked passes. This roll includes measurement means distributed along the roll in the axial direction in order to measure the force applied by the successive sections of the sheet metal in the transverse direction to each measuring element of the roll. The defects in inherent flatness are translated into a state of transverse stress in the sheet under longitudinal tension, causing inequalities in the distribution of the radial stresses exerted by the sheet on the different measuring elements of the roll during passage of the sheet over the deflector-roll. The measurement of these stresses or the deformations that they cause enable defects in inherent flatness of the sheet to be detected.

Known systems are produced by stacking a plurality of discontinuous measuring elements on a shaft. The outer surface of the roll is itself constituted by the outer surfaces of the same number of juxtaposed cylindrical rings which are free relative to one another in order to transmit without defect the per-unit pressures applied to each of them by the sheet. The outer surface of the roll, rotatably mounted on the shaft carrying the measuring elements, is in contact with the sheet as it passes by. This surface formed by rings free relative to one another therefore exhibits discontinuities which may produce problems in the rolling process because of the risk of marks which may appear on the sheet. This disadvantage may be corrected by covering the cylindrical rings with a continuous flexible envelope. However, the measurements are then vitiated with errors because the presence of the envelope creates interferences between the stresses exerted by the sheet on the different zones of the roll, with the result that the stresses measured no longer give an accurate picture of the stresses exerted by the sheet and hence the defects in inherent flatness of the sheet.

It is an object of the invention to provide a deflector roll for measuring and checking the flatness of sheet metal stretched in motion, said roll comprising:

a non rotatable inner portion providing axially spaced measuring zones spaced by neutral zones;

a plurality of devices for detecting radial stresses exerted by the sheet during its passage over said roll, said devices being mounted on said inner portion in said measuring zones;

an outer portion to be contacted by the sheet and capable of transmitting radial stresses exerted by the sheet to said measuring devices, said outer portion being formed by a one piece envelope having a continuous outer surface and a flexibility which varies in said axial direction such that the zones of said outer portion which cover said measuring zones of said inner portion have a flexibility under radial forces which is less than the flexibility of the zones of said outer portion which cover said neutral zones of said inner portion; and means mounting said outer portion on said inner portion for rotation relative thereto.

In a preferred embodiment of the invention the inner portion includes besides said devices for detecting radial stresses exerted by the sheet metal, devices for detecting the stresses due to differences in temperature between said outer portion and said inner portion of the roll, said second devices being arranged in zones insensitive to the stresses exerted by the sheet metal and enabling correction to be effected for thermal deviations.

The invention will be more fully understood from the following description of embodiments thereof, given by way of example only, with reference to the accompanying drawings.

Figure 1:
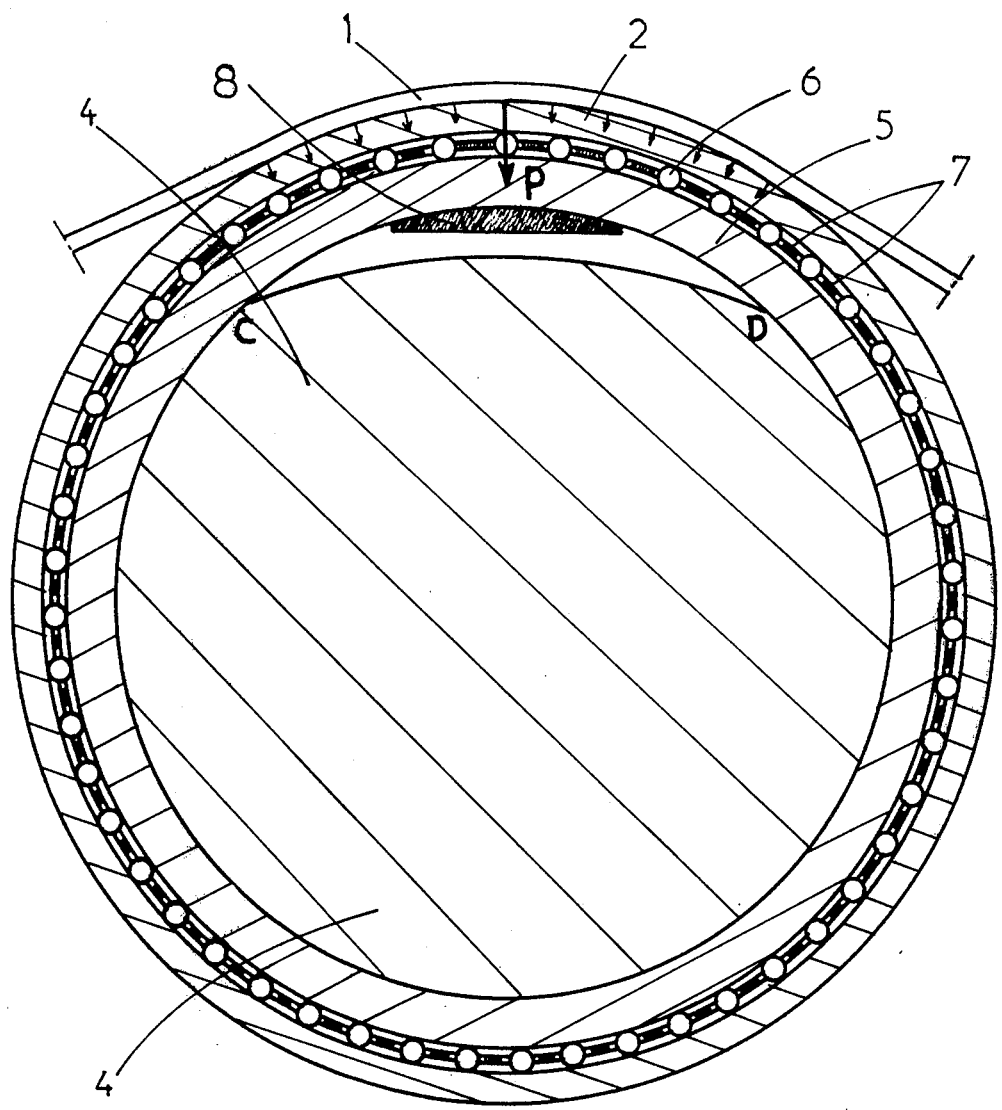
FIG. 1 is a transverse section through a roll in accordance with the invention at the level of a measuring zone.
Figure 2:
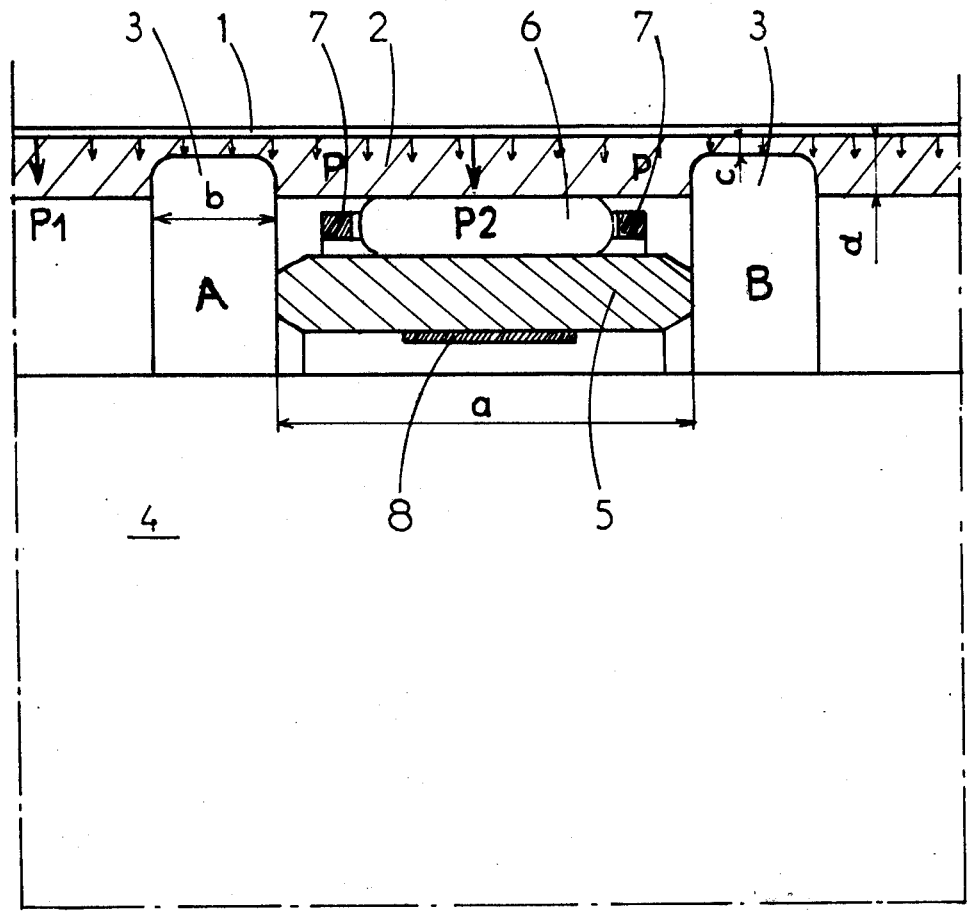
FIG. 2 is a longitudinal section through the roll of FIG. 1 and on the line A—A in FIG. 1, the section being restricted to one measuring zone and two neutral zones.
Figure 8:
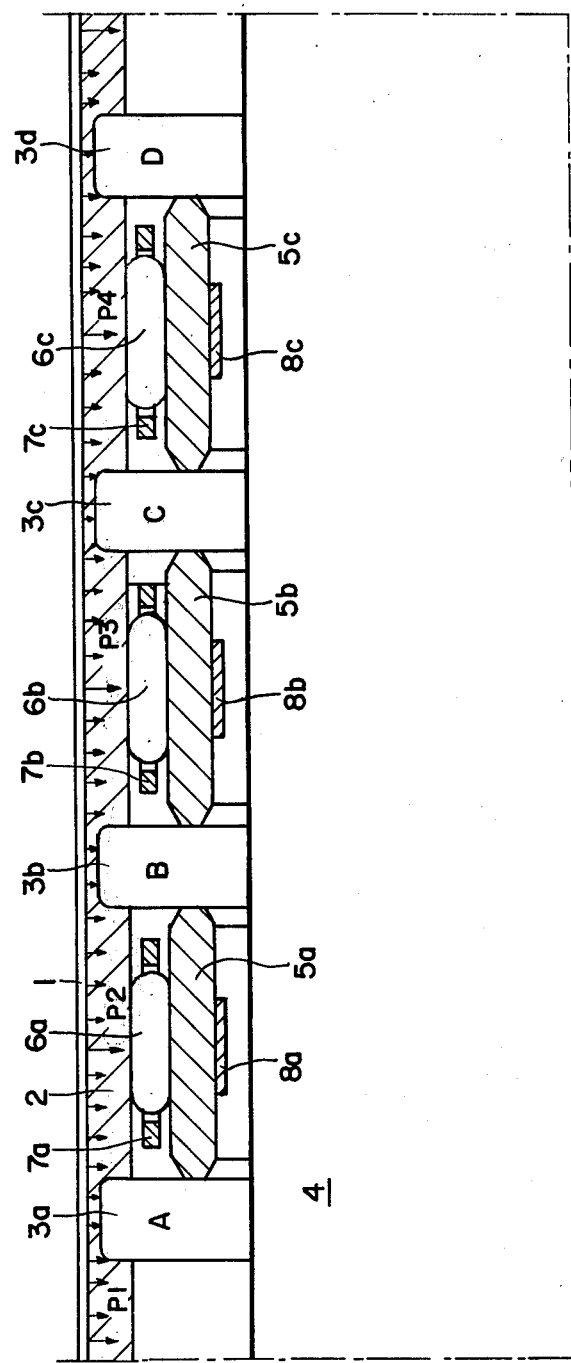
FIG. 8 corresponds to FIG. 2, but shows a plurality of measuring zones.

In FIGS. 1 and 2 a strip 4 is shown passing with a slight deflection over the outer portion of a deflector roll, which consists of a cylindrical envelope 2 having a smooth outer surface and an inner surface which is formed with grooves 3 uniformly spaced along the direction axial of the roll. The inner portion of the roll is formed by a shaft 4 on which is fixed a set of cylindrical rings 5. The outer cylindrical envelope 2 is mounted to be rotatable about the rings 5 by rollers 6 held in place by roller cages 7. The outer envelope 2, rings 5 rollers 6 and cages 7 therefore form a set of roller bearings, the ungrooved portions of the outer envelope of the roll forming the outer races. Each of the rings 5 is attached to the shaft 4 so that the greater portion of its inner surface is in contact with the shaft 4, the cross-section of which has a circular portion of diameter equal to the inside diameter of the rings 5. In FIG. 1 it can be seen that the top portion CD of the cross-section of the shaft 4 has a shape such that the ring 5 is no longer in contact with the shaft 4 from C to D. On the inner surfaces of the rings 5 which are not in contact with the shaft 4 are arranged strain gauges 8. In FIG. 2 a single ring 5 is shown. Other identical rings are arranged axially along the roll and spaced apart by a distance equal to the width of the grooves 3 in the outer envelope of the roll. E.g. FIG. 8 shows three zones, each zone corresponding to the zone shown in FIG. 2, and being denoted by respective suffixes a, b, and c. The width of the rings 5 is approximately equal to the width of the non-grooved zones of the other envelope of the roll and the mounting of the outer envelope 2 on the inner portion of the roll is such that the non-grooved portions of this envelope are arranged axially opposite the rings 5.

The zone of width $a$, which can be seen in FIG. 2 to contain the ring 5 with the measuring device 8 which is attached to it, constitutes a measuring zone.

The two zones of width $b$ to either side of the measuring zone, which frame this measuring zone and which correspond with the zones of the main shaft 4 upon which no rings 5 are mounted, constitute two neutral zones.

Hence the inner portion of the roll exhibits in the axial direction a succession of measuring zones and neutral zones, the grooved portions of the outer envelope covering the neutral zones of the inner portion.

The grooved portions of the inner surface of the outer envelope of the roll, which have a thickness $c$ less than the thickness $d$ of the remainder of the envelope therefore provide the envelope in the regions of the grooved portions with a flexibility under radial forces, which is greater than the flexibility of the non-grooved portions arranged above the measuring zones of the inner portion. It will be seen that the increased flexibility of the grooved zones of the outer envelope enables adaptation of the deformations of the different successive zones of this outer envelope.

Figure 3:
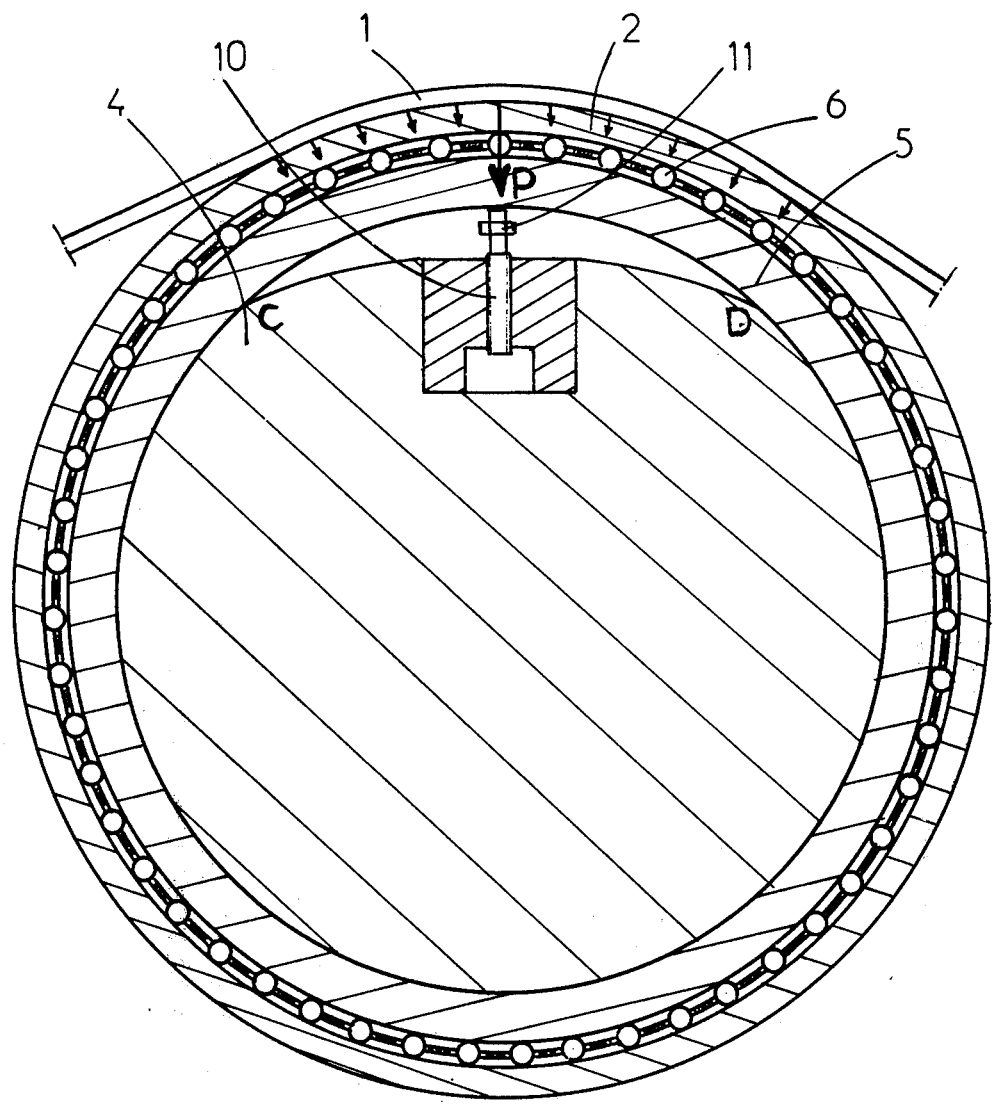
FIG. 3 is a view similar to that of FIG. 1 of a modification of the deflector roll of FIG. 1.

FIG. 3 shows a modification of the deflector roll of FIG. 1 in which each ring 5 no longer carries a strain gauge on the portion of its inner surface which is not in contact with the main shaft 4, but in which a displacement detector 10, such as a comparator, is arranged inside the shaft 4, the member 11 sensitive to displacement of this comparator 10 being in contact with the inner face of the ring 5. Thus the main shaft 4 carries a set of displacement sensors 10, distributed in the axial direction of the roll and arranged at the level of each of the rings 5.

The operation will now be described of a deflector roll as described above employed for the detection of defects in the inherent flatness of sheet metal stretched in passing over this roll.

The sheet metal 1 passing over the outer rotatable envelope of the deflector roll exerts on this outer envelope radial per-unit pressures $p$ represented by arrows in FIG. 1 at each of the points of contact between the sheet metal and the outer envelope of the deflector roll. The resultant of all these per-unit forces at a given instant is a vertical force P which is exerted by way of the rollers 6 on the ring 5 in the zone where its inner surface is not in contact with the main shaft 4. This force P causes a deformation of the ring 5 the amplitude of which may be measured by the strain gauge 8 in the embodiment of FIG. 1 (or by the comparator 10 in the embodiment of FIG. 3).

In FIG. 2 the forces P1 and P2 are shown which are exerted on two adjacent zones of the outer portion of the roll and hence upon the rings of two consecutive measuring zones of the inner portion of the roll. Defects in inherent flatness of the sheet metal are translated by a non-homogeneous distribution of the radial forces from this sheet upon the deflector roll. Thus significant differences will be able to be recorded, between the forces exerted by the sheet upon zones of the roll spaced in the axial direction. A difference between P1 and P2, for example, will be translated by different deformations of the corresponding rings 5, which are all identical, and hence by different signals from the displacement sensors. Differences in longitudinal tension whether or not connected with defects in inherent flatness of the sheet will similarly be able to be detected.

The different deformations from one zone to another of the portions of the outer envelope located at the level of the measuring zones of the inner portion of the roll will be absorbed by the flexing of the portion of the outer envelope which has been reduced down by the grooves 3 which lie above the neutral zones. Thus the deformation of any one of the zones of the deflector roll interferes only a little with the deformation of the other zone and the picture given by the detectors of the distribution of the radial stresses along the roll is hence quite representative of the state of inherent flatness or of tension in the sheet metal.

Another advantage of the roll of FIGS. 1 and 3 is that under an increasing force P the amplitude of the arc CD which is equal to the amplitude of the zone of the rings 5, which is not in contact with the main shaft, tends to diminish. This enables the increase in stress in the ring 5 to be reduced and consequently when the force P increases it achieves self-protection against accidental overloads.

It is clear that the influence of one measuring element upon the adjacent elements depends upon the choice of the properties between the dimensions $a$, $b$, $c$ and $d$. Correct choice of these dimensions enables the interference of one measuring element with the adjacent elements to be reduced to an acceptable value.

In the case where temperature deviations appear between the central shaft 4 and the rings 5 which are connected to it, the deformation of the rings 5 in their portion in contact with the stress detectors is influenced by this temperature deviation independently of any action exerted by the product to be measured.

The indications of the stress detectors are then no longer a function solely of the stresses applied by the sheet metal, but equally of the temperature deviations existing between the central shaft and the rings.

It is difficult if not impossible to correct these indications at every instant during the passing of the sheet metal.

In prior known devices the forces were generally transmitted from the periphery to the central portion of the roll, partly by the stress detectors themselves which served as a support.

In the device described, on the contrary, in which a relatively large deformation of the measuring zones under the forces exerted by the sheet metal is desirable in order to have a good picture of the stresses, the measuring zones do not ensure any transmission of forces and the detectors measure a displacement due to the deformation of the rings. This deformation is itself very dependent upon differences in temperature between the various portions of the roll.

In this case the effect of temperature upon the measurements is therefore very large and it is advisable to apply corrections.

Figure 4:
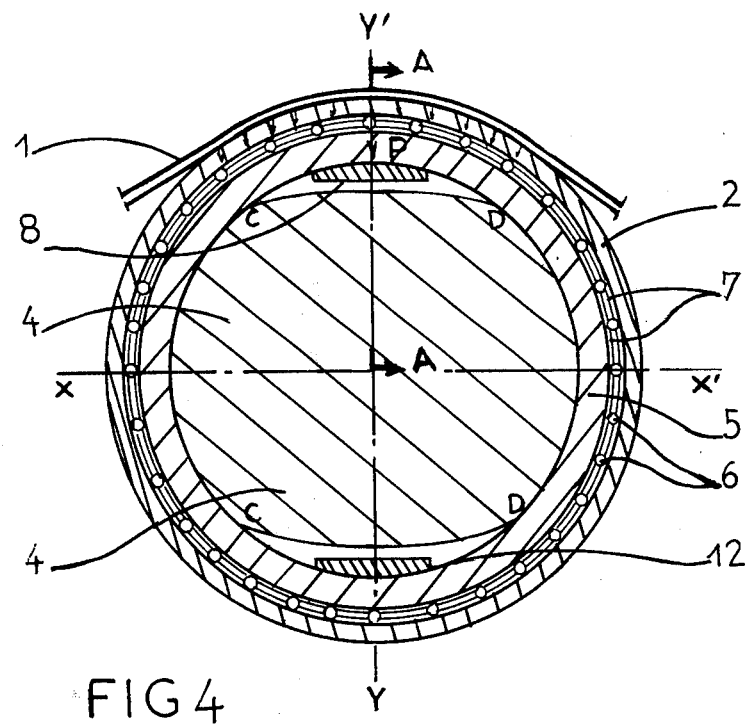
FIGS. 4 to 7 are views similar to that of FIG. 1 on a reduced scale of other embodiments in accordance with the invention.
Figure 5:
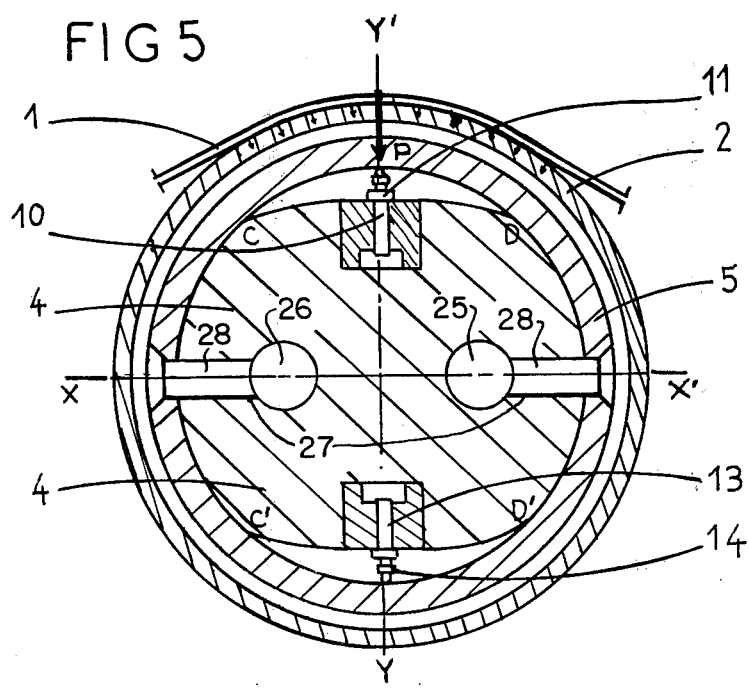

FIGS. 4 and 5 show an embodiment of a deflector roll which includes detectors for correction of deviations of thermal origin, and in which the inner portion of the roll is formed of a central shaft and rings tightened onto this shaft, FIG. 5 showing a hydromechanical bearing 27 having an oil entry region 25 and an oil discharge region 26, radial conduits 28 extending through the shaft 4 and the rings 5.

The strip 1, the inherent flatness of which is to be measured and checked, passes over the smooth outer surface of the rotatable envelope 2 of the roll, the inner surface of this envelope 2 being in contact with rollers 6 which enable rotation of the envelope 2 with respect to the fixed inner portion.

The inner portion is formed by a central shaft 4 upon which are mounted a set of rings 5 spaced from one another axially of the roller and bounding the different measuring zones.

These rings 5 are tightened onto the central shaft 4 so that there is contact between the shaft 4 and the rings 5 in zones such as C-C' and D-D' which are symmetrical with one another with respect to the axis of the roll.

The shaft 4 is on the other hand machined so that the rings 5 are spaced from the shaft 4 between the points C and D and C' and D', the zones C-D and C'-D' are obviously symmetrical with one another with respect to the axis of the roll.

The zones of the inner surfaces of the rings 5 which are not in contact with the shaft 4, that is to say, the portions of this inner surface lying between C and D and C' and D' carry strain gauges 8 and 12 (FIG. 4) arranged symmetrically with respect to the axis of the roll and centered at the intersection of the inner surface of the ring 5 with the diametral plane of the roll passing through Y-Y', or are in contact with the members 11 and 14 sensitive to displacement of two comparators 10 and 13 arranged symmetrically with respect to the axis of the roll in the vicinity of the diametral plane of symmetry passing through Y-Y' (FIG. 5).

The zones C-D and C'-D' of the rings arranged along the length of the roll are all symmetrical with respect to the plane through Y-Y' in the plane of the Figures and of identical amplitude.

If we assume that there is a temperature deviation between the rings 5 and the central shaft 4 due, for example, to the temperature of the sheet metal or of the environment being at the time higher than the temperature of the shaft, the indication given by the strain gauge 8 — or the comparator 10 — will be a function both of the radial stresses exerted by the sheet metal and of the temperature differences between the central shaft and the ring 5.

That is, the deformable portion of the ring 5 lying between C and D and the sensor which is in contact with this portion of the rings will undergo at any moment a deformation due on the one hand to the temperature deviations between the central shaft 4 and the ring 5, and on the other hand to the force exerted by the sheet metal 1 on the ring 5.

On the other hand the gauge 12 of the comparator 13 provides an indication which is a function only of the temperature deviation between the central shaft 4 and the ring 5, the portion C'-D' of the ring and the sensor not being subjected to the deformation due to the pressure exerted by the sheet metal.

If we designate by DT1 the deformation of the ring 5 measured by the sensor 8 or 10 under thermal effect, by DC1 the deformation of the ring 5 measured by the sensor 8 or 10 under the effect of the load from the strip 1 and by DT2 the deformation of the ring 5 measured by the sensor 12 or 13 under the thermal effect, it may be seen that the signal representing the difference between the signals from each of the detectors arranged symmetrically with respect to the axis of the roll, or DT1 + DC1 + DT2, is substantially equal to DC1, the deformation of the ring 5 due to the thermal effect being substantially identical at the level of the zone CD and of the zone C' D'.

The signal obtained by the difference between the signals given by the sensors 8 and 12 or 10 and 13 respectively, therefore really represents the radial stresses exerted by the sheet metal 1 upon the roll for measurement and checking of inherent flatness.

Hence by subtracting at any time the indications given by the sensors arranged symmetrically with respect to the axis of the roll, automatic compensation is achieved of thermal effects which disturb the measurements of radial stress exerted by the sheet metal.

This difference may be obtained directly in the circuit using the signals emitted by the sensors and used as a measuring and adjustment magnitude for checking or regulation of the inherent flatness of the sheet metal.

It may likewise be observed that the thermal effects peculiar to the measuring elements (the sensor 8 or 10 and 12 or 13) are also automatically compensated to the extent that the variation in temperature of the two sensors (8 or 10 and 12 or 13) is substantially the same.

Figure 6:
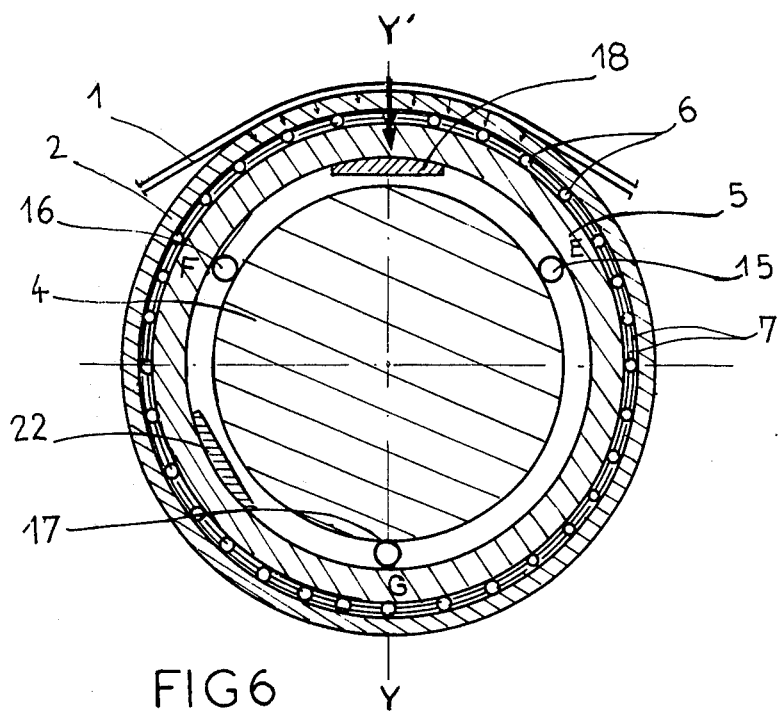
Figure 7:
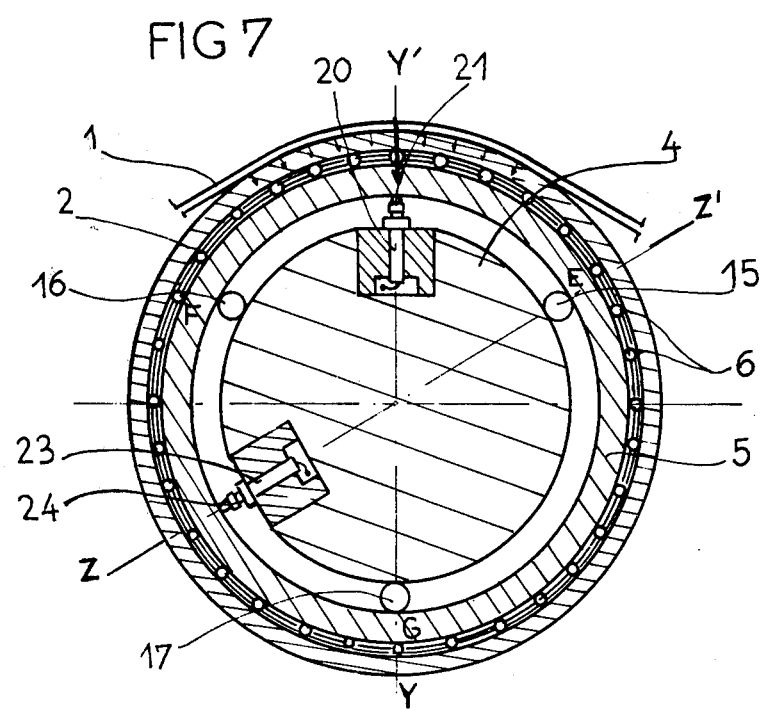

In FIGS. 6 and 7 another embodiment is shown in which the inner portion of the roll is formed of a central shaft upon which rings are mounted with the interposition of rollers.

The strip 1 the inherent flatness of which it is required to measure and check, passes over the smooth outer surface of the envelope 2 of the roll, the inner surface of this portion 2 being in contact with rollers 6 enabling rotation of the envelope 2 with respect to the fixed inner portion.

The inner portion is formed of a central shaft 4 upon which are arranged sets of three rollers 15, 16, and 17, one set per measuring zone — offset by 120° with respect to one another and arranged so that the diametral plane Y-Y' is a plane of symmetry for one of the rollers 17. This latter roller is diametrically opposite the midpoint of the zone of contact of the strip.

Onto these rollers are hooped a set of rings 5 spaced from one another axially of the roll and bounding the different measuring zones.

Connection of the rings to the shaft by way of three rollers allows micro-displacements at the level of the lines of contact.

The zones EF and FG of the inner surfaces of the rings 5 carry at the mid points strain gauges 18 and 22 (FIG. 6) centered at the intersection of the inner surface of the ring 5 with the diameter plane passing through Y-Y' as far as the zone EF is concerned and with the diametral plane passing through Z-Z' as far as the zone FG is concerned, or are in contact with the two comparators 21 and 24 (FIG. 7) arranged along the axis Y-Y' for the zone EF and the axis Z-Z' for the zone FG.

If we assume that there is a temperature deviation between the rings 5 and the central shaft 4 due, for example, to the temperature of the sheet metal and of the environment being at the time higher than the temperature of the shaft 4, the rings 5 will have then undergone a deformation with respect to their initial state; this deformation is shared over the 3 zones EF, FG and GE identically due to the bearing rollers and to the tightening of the ring onto the bearing rollers.

On the other hand the shaft heats up very slowly (point contact), hence its temperature may be considered uniform and so the arcs EF, FG vary by the same amount during the course of heating of the rings 5.

Hence by subtracting at any time the indication given by the sensors arranged in the zones EF and FG, automatic compensation is achieved of thermal effects which disturb the measurements of stress exerted by the sheet metal.

The invention is not intended to be restricted to the details of the embodiments which have just been described, but on the contrary comprises variants on them. Thus in order to obtain zones of different flexibility in the outer envelope of the roll it is possible to employ, instead of internal grooving of the envelopes, materials of different flexibilities for constituting the different successive zones of the envelope.

It is equally possible to employ for ensuring rolling of the outer envelope of the roll over the rings of the inner portion, instead of rolling elements as in the embodiment which has just been described, other devices such as a smooth hydromechanical bearing which may function either with a compressible fluid or with an incompressible fluid or with a slightly compressible fluid.

Likewise while the displacement sensors for detecting the radial stresses in the different rings arranged axially along the inner portion of the roll there have been described as strain gauges or displacement sensors of comparator type, but it is equally possible to employ other measuring devices such as pressure sensors which may be interposed between the main shaft and the ring which is associated with it in the zone where the inner surface of this ring is not in contact with the main shaft.

The measurements carried out by the different sensors arranged along the direction axial of the roll may be recorded numerically or shown visually. To do that electric cabling connected to the apparatus for recording or showing visually the results of the measurements by the sensors may pass along an axial cavity arranged inside the main shaft and be connnected to the measuring leads connected to each of the sensors distributed in the axial direction of the roll.

Instead of employing three rollers per ring as in the embodiments of FIGS. 6 and 7, mounting of the inner portion on four rollers may be employed, each ring of the inner portion being mounted on the central shaft with four rollers interposed.

While the invention is particularly applicable to the checking or adjustment of the inherent flatness of thin sheet metal during the course of rolling or at the end of an operation of transformation of the thin sheet metal, it is quite obvious that the above described deflector rolls are applicable to the checking of any flat metallurgical products. Finally, a deflector roll as above described may be associated with any installation for transformation of a metallurgical material in strips or in sheets or employed separately for checking the quality of a flat product after transformation.

What is claimed is:

1. A deflector roll for measuring and checking the flatness of sheet metal stretched in motion, said roll comprising:
   a non rotatable inner portion providing axially spaced measuring zones spaced by neutral zones;
   a plurality of devices for detecting radial stresses exerted by the sheet during its passage over said roll, said devices being mounted on said inner portion in said measuring zones;
   an outer portion to be contacted by the sheet and capable of transmitting radial stresses executed by the sheet to said measuring devices, said outer portion being formed by a one piece envelope having a continuous outer surface and a flexibility which varies in said axial direction such that the zones of said outer portion which cover said measuring zones of said inner portion have a flexibility under radial forces which is less than the flexibility of the zones of said outer portion which cover said neutral zones of said inner portion; and
   means mounting said outer portion on said inner portion for rotation relative thereto.

2. A deflector roll as claimed in claim 1, wherein said inner portion comprises a central main shaft and a plurality of rings extending about the periphery of said central shaft, the inner surfaces of which are in contact with the outer surface of said central shaft over only a portion of the surface, said rings being spaced from one another in the axial direction and being in contact by their inner surfaces in a portion where their inner surfaces are not in contact with said central shaft with said detecting device.

3. A deflector roll as claimed in claim 2, wherein said rings are not in contact with said central shaft in a second portion symmetrical with said first portion with respect to said axis of said roll said first and second portions of the rings being substantially of equal dimensions and having a common diametral plane of said roll as their plane of symmetry, and radial stress detecting devices are arranged in contact with said second portions of said inner surfaces of said rings in the vicinity of said plane of symmetry, said detecting devices in contact with said first and second portions supplying by difference a measurement of the stresses exerted by the sheet during the passing of the sheet over the roll.

4. A method of measuring and checking the flatness of sheet metal stretched in motion and using a deflector roll as claimed in claim 3, wherein the signals from said detecting devices in contact with said first and second portions of the inner surface of said ring in each measurement zone are subtracted and the difference used to provide an indication of the flatness of said sheet.

5. A deflector roll as claimed in claim 1, wherein said inner portion includes in said measurement zone devices for detecting radial stresses due to differences in temperature between said outer portion and said inner portion, said devices being arranged in zones insensitive to said radial stresses exerted by the sheet and enabling correction to be effected for thermal deviations.

6. A deflector roll as claimed in claim 5, wherein said inner portion comprises a central shaft upon which are arranged in each measuring zone a set of rollers located at right angles to said respective measuring zone, and which is mounted on rings, said rings being spaced from one another in the axial direction and each being in contact with detecting devices in at least two of the zones lying between two rollers of the respective set.

7. A deflector roll as claimed in claim 6 wherein each said set of rollers comprises three rollers.

8. A deflector roll as claimed in claim 6, wherein each said set of rollers comprises four rollers.

9. A method of measuring and checking the flatness of sheet metal stretched in motion and using a deflector roll as claimed in claim 6, wherein the signals from said detecting devices in said two zones of each measurement zone are subtracted and the difference used to provide an indication of the flatness of said sheet.

10. A deflector roll as claimed in claim 1, comprising rolling elements interposed between said outer portion and said inner portion.

11. A deflector roll as claimed in claim 1, wherein said outer portion is mounted for rotation about said inner portion by a smooth hydromechanical bearing.

12. A deflector roll as claimed in claim 1, wherein said stress detecting devices are strain gauges.

13. A deflector roll as claimed in claim 1, wherein said stress detecting devices are displacement sensors.

14. A deflector roll as claimed in claim 1, wherein said stress detecting devices are pressure sensors.

* * * * *